United States Patent [19]

Mello

[11] Patent Number: 5,199,302

[45] Date of Patent: Apr. 6, 1993

[54] TORPEDO TUBE DIFFERENTIAL PRESSURE TRANSDUCER

[75] Inventor: Frank P. Mello, Tiverton, R.I.

[73] Assignee: The United States of America as represented by the Secretary of the Navy, Washington, D.C.

[21] Appl. No.: 766,594

[22] Filed: Sep. 26, 1991

[51] Int. Cl.5 .............................................. G01L 7/00
[52] U.S. Cl. ................................... 73/714; 73/756; 114/238
[58] Field of Search ............... 114/238, 319; 73/714, 73/754, 756, 753, 716, 717

[56] References Cited

U.S. PATENT DOCUMENTS 3,108,562 10/1963 Riedel ............................... 114/238
4,835,717 5/1989 Michel et al. ...................... 73/756

Primary Examiner—Donald O. Woodiel
Attorney, Agent, or Firm—Michael J. McGowan; Prithvi C. Lall; Michael F. Oglo

[57] ABSTRACT

A conventional pressure transducer is provided on an adaptive connector which fits either of two "wet side" bulkhead fittings on the breech door of a torpedo tube. The transducer is electrically connected to a recording device in the submarine by means of a cable with an adaptive connector that is configured to be received on either of the two "dry side" bulkhead fittings.

2 Claims, 2 Drawing Sheets

TORPEDO TUBE DIFFERENTIAL PRESSURE TRANSDUCER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

This invention relates generally to monitoring the pressure inside a submarine torpedo tube both during actual weapon launches, and during maintenance firings.

(2) Description of the Prior Art

The primary aim of the present invention is to provide a convenient means for monitoring pressure inside the torpedo tube without violating the "sub-safe boundary" between the interior of the submarine and the interior of the torpedo tube. Prior art approaches to monitoring pressure within the torpedo tube have generally required that the transducer be provided in place of the sight glass normally provided in the breech door of the torpedo tube. This requires upsetting the "sub-safe boundary" (the boundary between the internal and external sides of the pressure hull) and entails substantial time and paperwork on the part of the persons accomplishing such a setup procedure to assure the safe operation of the submarine. The submarine is then required to conduct a "deep dive" to test such an installation in order to recertify the "sub-safe boundary" each time any such alteration is accomplished.

The present invention avoids the necessity for recertifying the "sub-safe boundary" in order to connect a pressure transducer inside the torpedo tube with recording equipment inside the submarine hull.

SUMMARY OF THE INVENTION

This invention resides in a submarine having a torpedo tube that is isolated from the submarine's pressurized hull. Such torpedo tubes are generally capable of firing at least two different types of torpedoes, in which case the torpedo tube has a breech door with at least two differently configured electrical bulkhead fittings for selectively connecting either type of torpedo in the tube to suitable electronic fire control equipment inside the submarine. In accordance with the invention a pressure transducer is provided inside the torpedo tube.

An adaptive connector is provided on the "dry side" of the breech door and is designed to fit both the differently configured electrical bulkhead connectors associated with the two types of torpedo fire control systems.

The transducer itself is mounted directly to an adaptive connector inside the torpedo tube. This connector is also configured to fit both electrical bulkhead connectors on the "wet side" of the breech door.

DESCRIPTION OF THE PREFERRED EMBODIMENT

Figure 1:
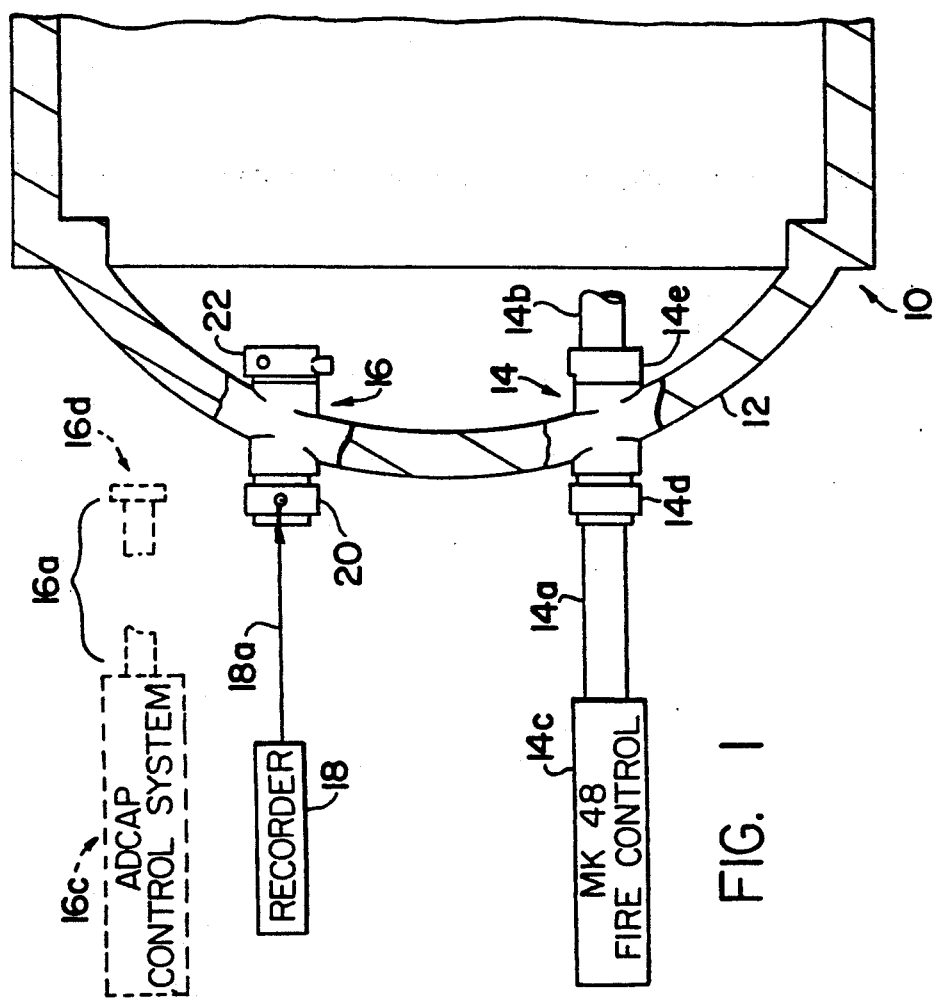
FIG. 1 illustrates in schematic fashion the various components normally provided in a submarine to fire either a torpedo or missile from a single torpedo tube, certain components being illustrated in broken lines and others in solid lines, and this view also illustrates one of two possible setups for providing a pressure transducer inside the torpedo tube and connected to recording equipment provided outside of the torpedo tube.

A typical torpedo tube of the type provided in present day attack submarines is illustrated schematically at 10 in FIG. 1. Such a torpedo tube 10 is adapted to fire at least two different types of torpedoes and/or missiles. For example, and in the embodiment shown, the torpedo tube is setup for firing Mark 48 torpedoes. A Mark 48 torpedo (not shown) is provided in the tube 10 and is connected to a Mark 48 fire control 14c through one of two bulkhead fittings 14 in the torpedo tube door 12. As shown the fitting 14 in the torpedo door 12 has a "dry side" connector 14d which is adapted to receive a cable 14a and the fitting 14 further includes a "wet side" connector 14e which is adapted to be connected to the torpedo (not shown) by suitable means such as indicated generally at 14b.

In the event that the torpedo tube were to be setup for firing a different torpedo or missile, as for example an ADCAP torpedo, a second bulkhead fitting 16 would be used to link an ADCAP control system 16c by means of a cable 16a to the "dry side" connector 16d and the wet side connector (not shown) would be provided to connect the ADCAP control system to the ADCAP torpedo inside the torpedo tube in the same manner as described previously with reference to the Mark 48 torpedo.

In accordance with the present invention advantage is taken of the presence of the second fitting 16 to provide a convenient mounting location for a pressure transducer or sensor as indicated generally at 22. The sensor 22 is provided in place of a "wet side" connector cap (not shown) on the fitting 16 as shown. The sensor 22 is electrically connected to a recorder 18 provided on the "dry side" of the torpedo tube through a "dry side" adapter 20 to be described. It will be apparent that this configuration provides for fire control and status information with respect to the Mark 48 torpedo in the tube 10, and simultaneously, pressure sensor recordings during the firing of that type of torpedo.

In the event that the torpedo tube 10 were to be configured for firing some other missile or torpedo as for example an ADCAP torpedo, the bulkhead fitting 16 would be used for connecting a suitable control system such as that indicated in phantom lines at 16c in FIG. 1 to the ADCAP torpedo via the bulkhead fitting 16 which is adapted to receive the cable connector 16d and which would be so configured as to receive an internal connection (not shown) similar to that described previously with reference to the Mark 48 torpedo and the connection 14b and 14e.

In the event that torpedo tube 10 were to be so configured as described above for firing ADCAP torpedoes the bulkhead fitting 14 would be used to mount the pressure transducer 22 and the "dry side" of the fitting 14 would be used to connect the output of the transducer to the recorder 18 by means of the adapter 20.

Figure 2:
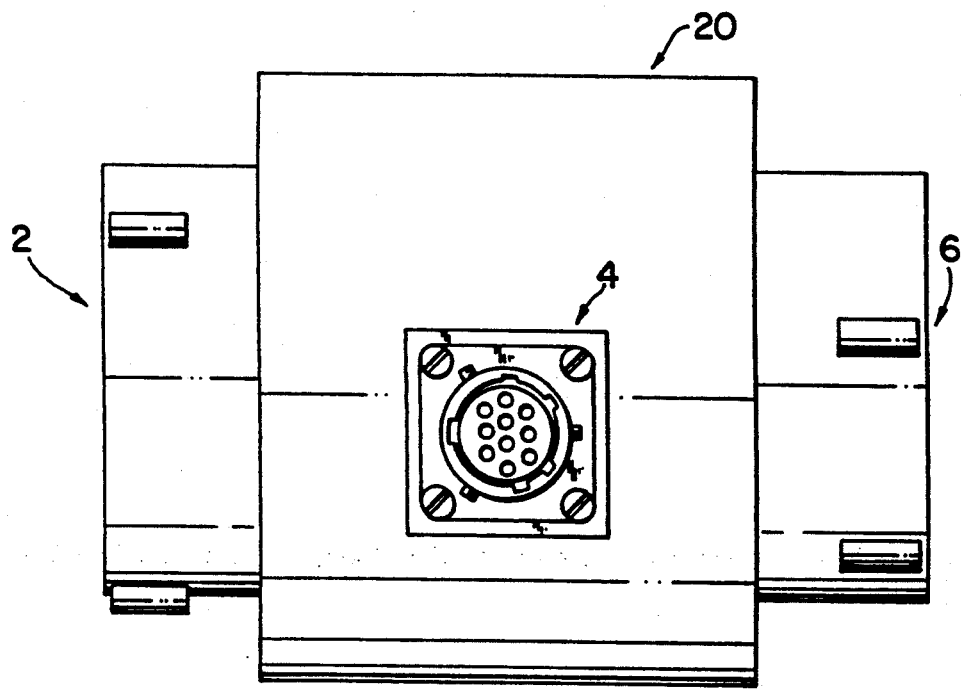
FIG. 2 shows a "dry side" adaptive connector in accordance with the present invention.
Figure 3:
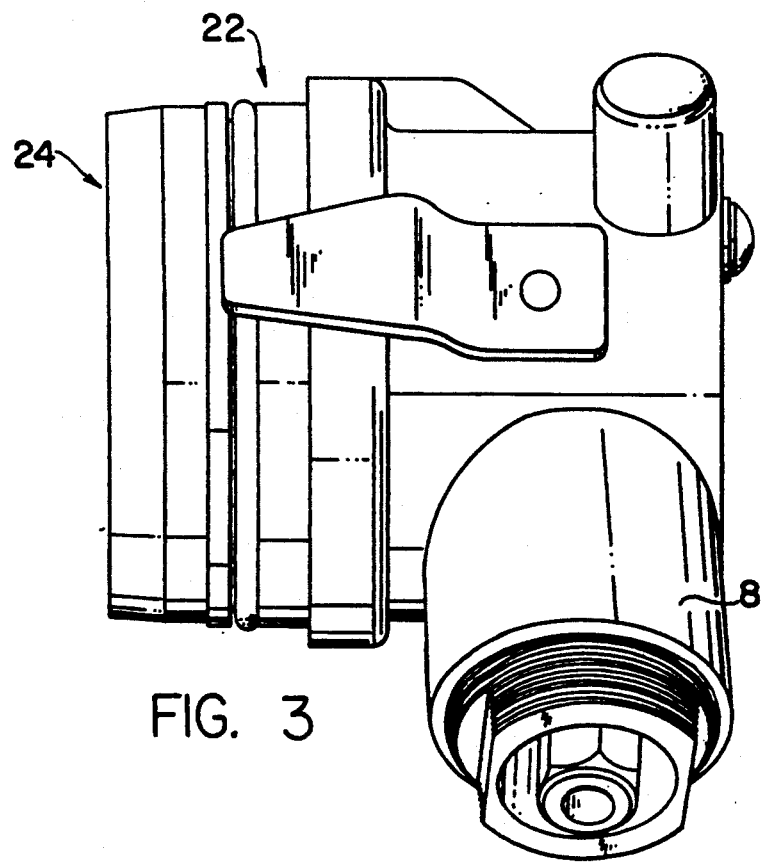
FIG. 3 illustrates a torpedo tube pressure sensor of the type adapted to be received on either of the two "wet side" connectors in the torpedo tube door.

Turning now to a more detailed description of the adapter 20, FIG. 2 shows the adapter 20 as including an electrical port 4 which is adapted to receive the cable 18a used to provide the output from the pressure sensor 22 to the recorder 18. A first side 2 of the adapter 20 has 65 pins and is adapted to mate with the "dry side" connector of the bulkhead fitting 14 used to connect the Mark 48 fire control with the Mark 48 torpedo as described previously. The opposite side 6 of the adapter 20 is adapted to mate with the "dry side" of the bulkhead fitting 16 used to connect the ADCAP control system to the ADCAP torpedo as described previously. This adapter 20 thus provides two alternate sources of electrical input from the sensor 22 to its electrical port 4 so as to permit use either with the bulkhead fitting 16 or in the alternative with the bulkhead fitting 14 depending upon which type of torpedo is being fired from the tube.

Turning now to a more detailed description of the pressure sensor 22 the transducer portion is indicated generally at 8, and the adapter connector portion 24 is uniquely configured so as to mate with the "wet side" of fitting 16 or the "wet side" of fitting 14. The "wet side" of both fittings is so designed as to take a common cap (not shown) seal off the fitting not being used. Advantage is taken of the fact that the "wet side" configuration of both fittings 14 and 16 is designed to receive such a cap. The pressure sensor transducer 8 is also designed to mate with the "wet side" of either of the fittings 14 and 16, and via the adapter 20 provide input to the recorder 18.

What is claimed is:

1. In a submarine having a torpedo tube which is isolated from the submarine interior, and which is capable of firing at least two different types of torpedoes, and which tube further includes a breech door for the torpedo tube with two differently configured electrical bulkhead fittings for selectively connecting either of said type of torpedoes in the tube to fire control equipment provided inside the submarine, the improvement comprising:
   pressure transducer means inside the torpedo tube;
   adapter connector means for said pressure transducer means, said adapter connector means configured to fit a pair of differently configured electrical connectors, said adapter connector means further including a "wet side" portion carrying said pressure transducer means and further adapted to be received on the "wet side" of either of said two bulkhead fittings inside said torpedo tube, said adapter connector means further including the "dry side" portion adapted to be received on the "dry side" of either of said bulkhead fittings inside the submarine interior.

2. The combination of claim 1 wherein said adaptive connector means "dry side" portion comprises a reversible adapter with a single electrical outlet port (4) and oppositely disposed "dry side" connector faces for mating with either of said "dry side" of said two bulkhead fittings respectively.

* * * * *